Jan. 3, 1950 E. W. ANDERSON ET AL 2,493,379

PULSE GENERATING CIRCUIT

Filed July 25, 1947

Inventors
E. W. Anderson
T. J. McDermott
By: [signature]
Attorney

Patented Jan. 3, 1950

2,493,379

UNITED STATES PATENT OFFICE 2,493,379

PULSE GENERATING CIRCUIT

Eric W. Anderson, London, and Terence John McDermott, Romford, England

Application July 25, 1947, Serial No. 763,624
In Great Britain February 16, 1945

Section 1, Public Law 690, August 8, 1946
Patent expires February 16, 1965

8 Claims. (Cl. 177—380)

Figure 1:
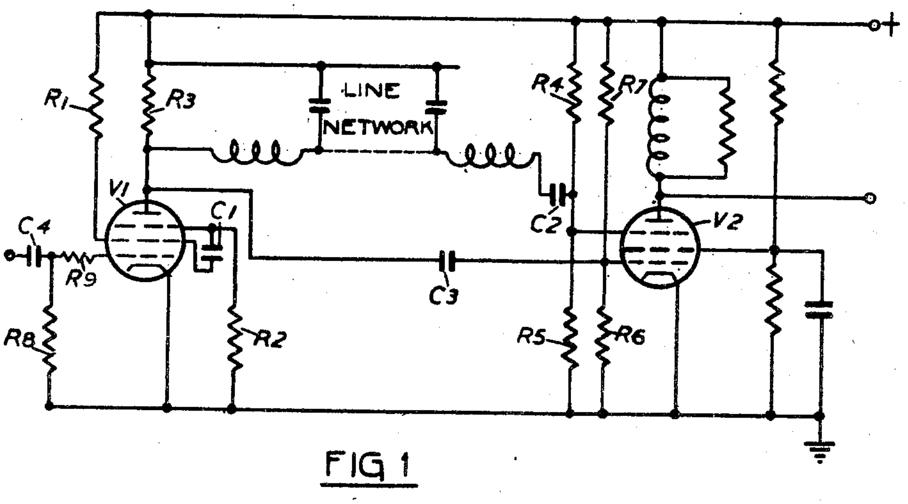

The present invention relates to electronic circuit arrangements and more particularly to circuit arrangements for generating pulsed signals for use in communication systems, for example television systems to provide a marker or synchronising signal consisting of distinctive groups of pulses. The invention may also be applied to multiplex communication systems of the type in which a train of pulses, one corresponding to each channel, is followed or preceded by a marker or synchronising signal. In such multiplex systems it is advantageous to have a special form of marker or synchronising signal to minimise the risk of the apparatus, intended to be controlled by the marker or synchronising pulse, being operated by spurious signals such as noise or interference or by chance arrangement of the intelligence carrying pulses in the communication system.

The object of the present invention is to provide improved means for generating a marker or synchronising signal consisting of discrete pulses.

One form of marker or synchronising signal which is not liable to be simulated by noise, random interference or by chance arrangement of the intelligence carrying pulses consists of a plurality of, for example three discrete pulses which are spaced apart in time by accurately determined amounts and the present invention relates to a circuit arrangement for producing such a marker or synchronising signal.

According to the present invention, therefore, an electronic apparatus for generating signals each consisting of a plurality of discrete pulses comprises a triggering circuit for deriving rapid voltage changes from a controlling voltage, a delay circuit adapted to convey said rapid voltage changes to a utilization point and back with a finite delay in each direction and means for deriving from said triggering circuit and said utilization point pulses displaced from one another in time by integral multiples of said finite delay.

According to this invention in one form, an electronic apparatus for generating signals each consisting of three evenly spaced discrete pulses comprises a triggering circuit for deriving a rapid voltage change from a controlling voltage, a delay circuit adapted to convey said rapid voltage change to a utilization point and back with a finite delay in each direction, and means for deriving a first pulse from said triggering circuit, a second pulse, delayed from said first pulse by said finite delay, from said utilization point and a third pulse from said triggering circuit said third pulse being delayed from the second pulse by said finite delay, being generated by the arrival back of said rapid voltage change from said utilization point, through said delay circuit.

The marker or synchronising signal formed by a circuit arrangement according to the present invention may be initiated by some periodic controlling voltage or pulse of sinusoidal form or by an oscillation of non-sinusoidal form, such as a sawtooth wave, in which case the triggering circuit produces the leading edge of the first discrete pulse of the marker or synchronising signal at a controlled time interval after the commencement of the cycle of the periodic controlled voltage.

According to another feature of the present invention the triggering circuit is arranged as a transitron valve circuit generating the first discrete pulse at a specific time after the flyback of an imposed recurrent sawtooth wave.

According to a further feature of the invention the delay circuit is in the form of an artificial line. The output of the triggering circuit to the line may be matched to the characteristic impedance of the line, whereby the rapid voltage change applied to the line is absorbed on its return to the input end of the line and the end of the line at the utilization point is effectively open circuited whereby the voltage change is reflected back into the line on reaching the utilization point.

According to yet another feature of the invention, the circuit arrangement comprises an output stage adapted to be operated by pulses applied thereto either directly from the triggering circuit or from the utilisation point fed through the delay circuit or line, the output stage comprising a multi-electrode valve having at least two controlling electrodes each adapted to control the current through the valve so as to produce an output pulse therefrom in response to an input pulse applied to either controlling electrode, pulses from the triggering circuit being applied to one of the controlling electrodes and pulses from the utilisation point being applied to the other controlling electrode.

The leading edges of the discrete pulses forming the marker or synchronising signal generated by an arrangement according to the present invention are spaced apart by accurately determined amounts but it is not necessary that the pulses should be first generated at the correct length for final transmission. Additional means may be provided for shaping the discrete pulses, to their final form. This may be achieved in the output stage above referred to.

In order that the invention may be more clearly understood reference will now be made to the accompanying drawings, which illustrate an embodiment of the invention by way of example only. In the drawings: Fig. 1 is a circuit diagram of the arrangement while Fig. 2 is a diagram showing certain voltage and current waveforms occurring in the circuit.

In the circuit diagram shown in Fig. 1 pentode valve V1, by virtue of the screen feed resistor R1, condenser C1 coupling screen and suppressor grids and resistor R2 connecting the suppressor grid to earth, is arranged to operate as a transitron. The generation of a saw tooth voltage by a Miller transition circuit is disclosed in U. S. Patent No. 2,412,485 to Whiteley granted December 10, 1946. The anode load R3 is matched to an artificial line or delay network, the voltage across R3 being applied to the input of the network, the network being so dimensioned that the time of propagation of a pulse down the network corresponds to the desired delay between pulses, in the present example, exactly 3 microseconds. The remote end of the network is effectively open-circuited, being connected to the suppressor grid of a valve V2 which is provided with a small positive bias by resistors R4 and R5. The coupling of the open circuited end of the network to the suppressor grid is provided by the short time constant differentiating circuit C2 and R5. The anode of V1 is coupled to the control grid of V2 by a short time constant differentiating circuit C3 and R6. The grid is provided with small positive bias through the potentiometer R6 and R7.

The operation of this circuit will be considered when controlled by an applied sawtooth voltage such as that produced by a Miller time base generator but other recurrent waveforms may also be employed.

Figure 2:
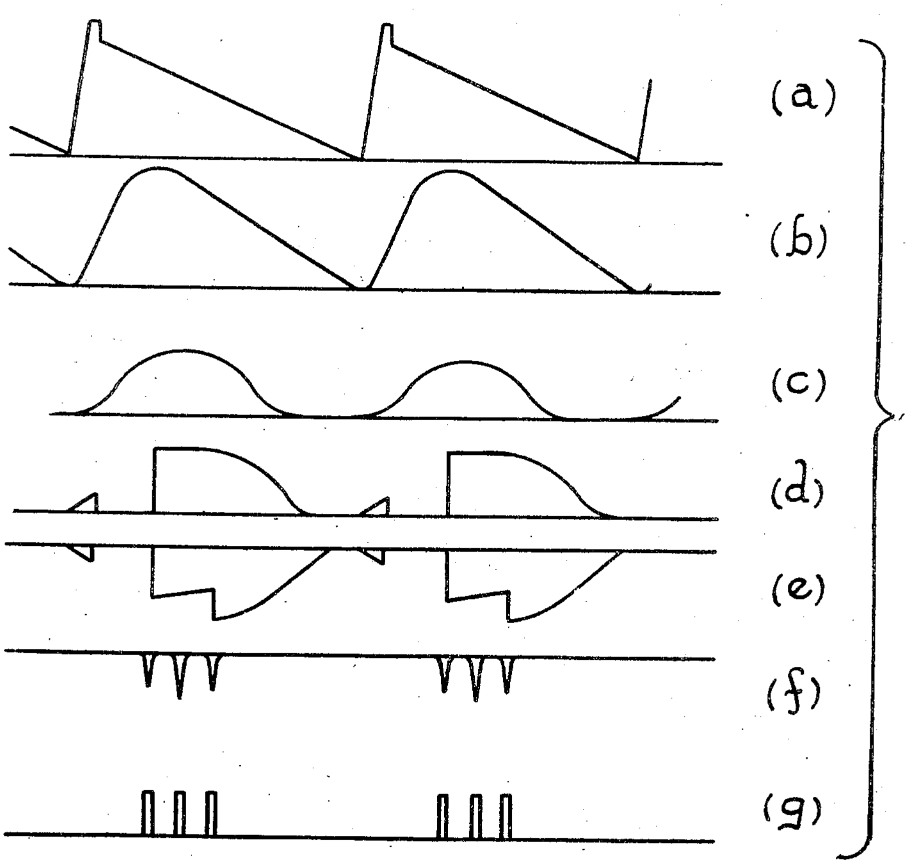

The sawtooth voltage wave produced by a Miller transitron oscillator is shown in Fig. 2(*a*). This wave is fed to the grid of V1 via condenser C4 and stopping resistance R9 so arranged in conjunction with the high grid leak resistance R8 that the grid of V1 is not able to follow the applied voltage with sufficient rapidity to produce the sharp pulse on the top of the wave. The actual voltage variation on the grid of V1 is as shown in Fig. 2(*b*), and as the valve biasses itself back by grid current flow, a pulse of cathode current flows each cycle, as in Fig. 2(*c*).

When the cathode current commences to flow, anode current is inhibited almost immediately by the transitron action. After a delay which is determined by the time constant of the screen-suppressor coupling circuit, anode current commences to flow and rises rapidly as in Fig. 2(*d*), producing a negative voltage step at the anode of V1, as shown in Fig. 2(*e*). This negative voltage step is differentiated by C3 and R6 and applied to the grid of V2 to produce a short positive pulse at the anode of V2. The negative voltage step also travels down the delay network and after an interval of 3 microseconds arrives at the open end of the line where it is reflected and travels back to the input of the line. The wave on first arriving at the open circuited end of the network, in addition to being reflected, produces a negative pulse on the suppressor grid of V2 due to the circuit C2 R5. This pulse produces in the anode circuit of V2 the second positive pulse. The reflected wave in the network on reaching the anode of V1 is absorbed by R3 and produces a further negative voltage step at the anode as shown in Fig. 2(*e*); this is, in turn, differentiated and applied to the control grid of V2 to produce the third positive output pulse from the anode of V2.

The combined control grid and suppressor grid pulses of V2 are shown in Fig. 2(*f*) and the output pulses from the anode will be of the form shown in Fig. 2(*g*). If it is desired to produce shorter pulses a further differentiating process may be carried out by suitable means, such as a small inductance in the anode circuit as shown, the differentiated pulse produced by the leading edge of the negative anode current pulse being further shaped if desired.

It is convenient when utilising the circuit described as the marker or synchronising signal generator for a multiplex pulse system, that the anode circuit of V2 should be common also to the valves producing the time modulated channel pulses. The final pulse length and shape determining circuit will then be effective on all pulses and produce the required combined output.

It will be seen that with the use of a waveform as shown in Fig. 2(*a*) to produce the timing of the various channel pulses of a multiplex system, in known manner, the initial delay caused by the transitron action of V1 enables the marker or synchronising signal to be initiated at some controlled time after the flyback of the sawtooth wave and thus be free from any spurious pulses set up in the channel valves by the flyback.

The marker or synchronising signal produced by the circuit described above with reference to Figs. 1 and 2, comprises three single pulses of equal length which are evenly spaced by an accurately determined amount. In a particular eight channel pulse multiplex system embodying such a marker or synchronising signal, pulses of duration of the order of 0.3 microsecond and having a repetition frequency of 8 kc. are employed, the marker or synchronising signal comprising three pulses of the standard length of 0.3 microsecond, the time intervals between the leading edges of first and second pulses and second and third pulses being both 3 microseconds.

We claim:

1. An electronic apparatus for generating signals each consisting of three evenly spaced discrete pulses comprising a triggering circuit for deriving a rapid voltage change from a controlling voltage, a delay circuit adapted to convey said rapid voltage change to a utilisation point and back with exactly the same finite delay in each direction, and means for deriving a first pulse from said triggering circuit, a second pulse, delayed from exactly the same first pulse by said finite delay, from said utilisation point and a third pulse from said triggering circuit, said third pulse being delayed from the second pulse by exactly the same finite delay, being generated by the arrival back of said rapid voltage change from said utilisation point, through said delay circuit whereby the said pulses are automatically spaced equally apart with great accuracy.

2. Apparatus as claimed in claim 1 comprising an output stage adapted to be operated by pulses applied thereto directly from said triggering circuit and from said utilisation point fed through the delay circuit comprising an artificial line, said output stage comprising a multi-electrode valve having at least two controlling electrodes each adapted to control the current through the valve so as to produce an output pulse therefrom in response to an input pulse applied to either controlling electrode, pulses derived from the triggering circuit being applied to one of said controlling electrodes and pulses from the utilisation point being applied to the other controlling electrode.

3. A pulse generating circuit comprising, means deriving a sharp voltage pulse, delay means having an input terminal and an output terminal and arranged to convey said sharp voltage pulse from said input terminal to said output terminal and back with exactly the same finite delay in each direction, an electronic valve having at least two electrodes for controlling the electronic current therein, one of said electrodes being effectively connected to said input terminal and the other of said electrodes being effectively connected to said output terminal whereby a plurality of discrete pulses are spaced equally apart.

4. In a pulse generating device, a circuit for deriving a sharp voltage pulse, a delay circuit comprising an artificial line net work having an input terminal and an output terminal, said delay circuit arranged to convey said sharp voltage pulse from said input terminal to said output terminal and back with the same finite delay in both directions, an electron discharge tube having a plurality of electrodes for controlling the electronic current therein, one of said electrodes being effectively connected to said input terminal and the other of said electrodes being effectively connected to said output terminal whereby a signal of evenly spaced discrete pulses is generated.

5. The combination set forth in claim 3, and means for shaping pulses derived from the output of said electronic valve to a desired wave form.

6. In a pulse generating device, a triggering circuit for deriving a sharp voltage pulse from a controlling voltage and feeding an artificial line having an input terminal and an output terminal, said artificial line arranged to convey said sharp voltage pulse from said input terminal to said output terminal and back to the input terminal with a finite delay in each direction, the said triggering circuit being matched to said artificial line so that the said sharp voltage pulse is absorbed on its return to the input end of said artificial line, an electronic valve having a plurality of electrodes for controlling the electronic current therein, one of said electrodes being effectively connected to said input terminal and the other of said electrodes being effectively connected to said output terminal whereby a signal of at least three evenly spaced discrete pulses is created.

7. The combination set forth in claim 6, said triggering circuit having an electronic valve connected to operate as a transitron.

8. The combination set forth in claim 6, and means for shaping to a desired waveform pulses derived from the output of said electronic valve.

ERIC W. ANDERSON.
TERENCE JOHN McDERMOTT.

REFERENCES CITED

The following references are of record in the file of this patent:

UNITED STATES PATENTS

| Number | Name | Date |
|---|---|---|
| 2,089,639 | Bedford | Aug. 10, 1937 |
| 2,145,332 | Bedford | Jan. 31, 1939 |
| 2,212,173 | Wheeler | Aug. 20, 1940 |
| 2,217,957 | Lewis | Oct. 15, 1940 |
| 2,252,599 | Lewis | Aug. 12, 1941 |
| 2,265,154 | Blumlein | Dec. 16, 1941 |
| 2,266,154 | Blumlein | Dec. 16, 1941 |